United States Patent [19]
Brandell

[11] Patent Number: 5,579,969
[45] Date of Patent: Dec. 3, 1996

[54] MAP HOLDER

[76] Inventor: Bernie Brandell, 1179 51st St., Brooklyn, N.Y. 11219

[21] Appl. No.: 491,308
[22] Filed: Jun. 16, 1995
[51] Int. Cl.⁶ ........................................................ B60R 7/00
[52] U.S. Cl. ........................ 224/277; 224/412; 224/549; 40/658
[58] Field of Search ........................................ 224/277, 274, 224/411, 33 A, 36, 30 A, 37, 247, 567, 570, 412, 549; 248/441.1, 443, 447, 460, 463; 116/303; 40/658, 659, 652

[56] References Cited

U.S. PATENT DOCUMENTS

| | | |
|---|---|---|
| 436,403 | 9/1890 | Dabbs . |
| 593,978 | 11/1897 | Boehm .................................. 224/37 |
| 909,219 | 1/1909 | Putnam ................................. 40/658 |
| 1,209,750 | 12/1916 | O'Leary ................................ 248/443 |
| 1,539,042 | 5/1925 | Dennis ................................. 248/443 |
| 1,576,028 | 3/1926 | Bower . |
| 1,773,337 | 8/1930 | Barlow . |
| 1,796,243 | 3/1931 | Coughlin . |
| 2,632,619 | 3/1953 | Wilson ................................ 224/570 |
| 3,060,625 | 10/1962 | Glass et al. . |
| 3,398,475 | 8/1968 | Palmer ................................. 40/658 |
| 4,071,174 | 1/1978 | Weiner . |
| 4,271,616 | 6/1981 | Boykin ................................ 40/659 |
| 4,415,106 | 11/1983 | Connell et al. . |
| 4,800,664 | 1/1989 | Marstall . |
| 4,828,151 | 5/1989 | Goss . |
| 5,106,001 | 4/1992 | Figinski . |

FOREIGN PATENT DOCUMENTS

| | | | |
|---|---|---|---|
| 111726 | 9/1968 | Denmark ............................... 224/37 |
| 353234 | 9/1905 | France ................................. 248/443 |
| 136663 | 1/1902 | Germany ............................. 248/443 |
| 3902824 | 8/1990 | Germany ............................. 224/277 |
| 132984 | 2/1947 | Sweden .............................. 248/444 |
| 688912 | 3/1953 | United Kingdom ................. 224/277 |

Primary Examiner—Henry J. Recla
Assistant Examiner—Charles R. Eloshway
Attorney, Agent, or Firm—Brumbaugh, Graves, Donohue & Raymond

[57] ABSTRACT

A map holder comprises a holder and a positioner for maintaining the holder in a first position and for applying a force to and urging the holder to a second position. The positioner further comprises a latch for maintaining the holder in a first position and a spring for urging the holder to a second position when the latch is released. The holder may also include a sleeve or support for connecting the map holder to a person's arm or wrist, or to a steering wheel, dashboard, windshield, or handlebar.

15 Claims, 5 Drawing Sheets

MAP HOLDER

FIELD OF THE INVENTION

The present invention is directed to map holders and, more particularly, to spring-loaded map holders.

BACKGROUND OF THE INVENTION

Using maps while attempting to steer a vehicle, including automobiles, boats, bicycles, etc., is problematic. An unsafe situation can be created when the driver or rider must pull the map from a pocket, pouch, glove compartment, etc., and open the map for viewing. At best, this type of maneuver is both awkward if not impossible to perform, as well as dangerous.

Various devices have been proposed for holding a map such that it can be easily viewed by the driver. However, a common problem with such map holders is that they are not oriented for easy use by a driver of the vehicle. For example, the map holders disclosed in U.S. Pat. Nos. 4,415,106, 4,800,664, 4,828,151, and 5,106,001 have a transparent map "pocket" that both provides support to the map as well as avoids any flutter due to wind. Such arrangement is limiting, however, since a rider can only put in the pocket a piece of paper as large as the map pocket. If the map is larger than the map pocket, the rider must fold it possibly several times to fit it inside the map pocket. Nevertheless, if a rider wants to look at notations on the back side of the map or at a hidden part of the map, the rider must take the map out of the map pocket. This maneuver is very difficult to perform while moving.

Additionally, other map holders may block or limit the field of view of the driver even when access to the map is not required, creating another hazardous situation. For example, U.S. Pat. No. 1,796,243 describes a map holder made out of a single wire shaped into a double loop. In addition, U.S. Pat. No. 4,071,174 discloses a map holder attached to the windshield, with a double coil spring. Both of these map holders allow the rider to use most maps with no burdensome folding. However, a driver cannot put them out of the driver's field of view easily. Thus, they may block or limit the field of view of the driver.

Finally, more athletes now have turned to aerodynamics with the hope that a more aerodynamic component will make them go faster and reduce time in a race. However, many map holders are not aerodynamically efficient. For example, the map holders described in U.S. Pat. Nos. 1,796,243, 4,071,174, and 4,828,151, all have large frontal areas (mainly because of the map), even when not in use.

It is thus an object of the invention to provide a map holder that is easy to use while driving or riding a vehicle, or during exercise.

It is further an object to the invention to provide a map holder that has access to the map for easy installment and removal.

It is also an object of the invention to provide a map holder that does not necessitate burdensome folding of the map.

It is further an object of the invention to provide a map holder that does not block or limit the field of view of the driver when access to the map is not required.

It is also an object of the invention to provide a map holder that does not create any substantial air drag when access to the map is not required.

SUMMARY OF THE INVENTION

The objects of the invention are met by a map holder comprising holding means for holding a map and positioning means for maintaining the holding means in a first position and for urging the holding means to a second position. The holding means is preferably a split ring. The split ring allows access to the map for easy installment and removal, as well as obviating the need for burdensome folding of the map.

The positioning means further comprises latch means for maintaining the holding means in a first position, and spring means for applying a force and urging the holding means to a second position when the latch means is released. The spring means can be a mechanical wire spring, an elastometer, a pneumatic spring, an elastic mechanism, etc.

In addition, the map holder further includes support sleeve means for supporting the positioning means. This sleeve means can be, for example, an arm band or wrist band that supports the map holder.

Alternatively, the map holder further includes support means for supporting the positioning means. This support means can be, for example, a base or support that connects the map holder to a steering wheel, a dashboard, a windshield, a handlebar, etc.

BRIEF DESCRIPTION OF THE DRAWINGS

FIG. 1 is a perspective view of a first embodiment of the invention, wherein

FIG. 2 is a perspective view of a second embodiment of the invention, wherein FIG. 3 is illustrates a third embodiment of the invention, wherein FIG. 4 is a perspective view of a second embodiment of the invention, wherein

DETAILED DESCRIPTION OF THE INVENTION

Figure 1A:
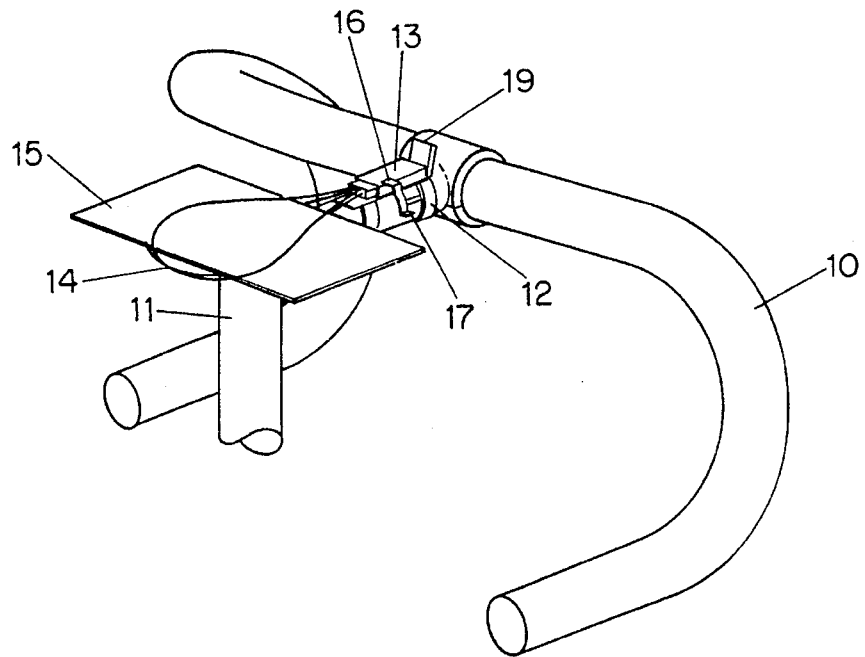
FIG. 1(a) illustrates the embodiment in a latched position and FIG. 1(b) illustrates the embodiment in an upright position.
Figure 1B:
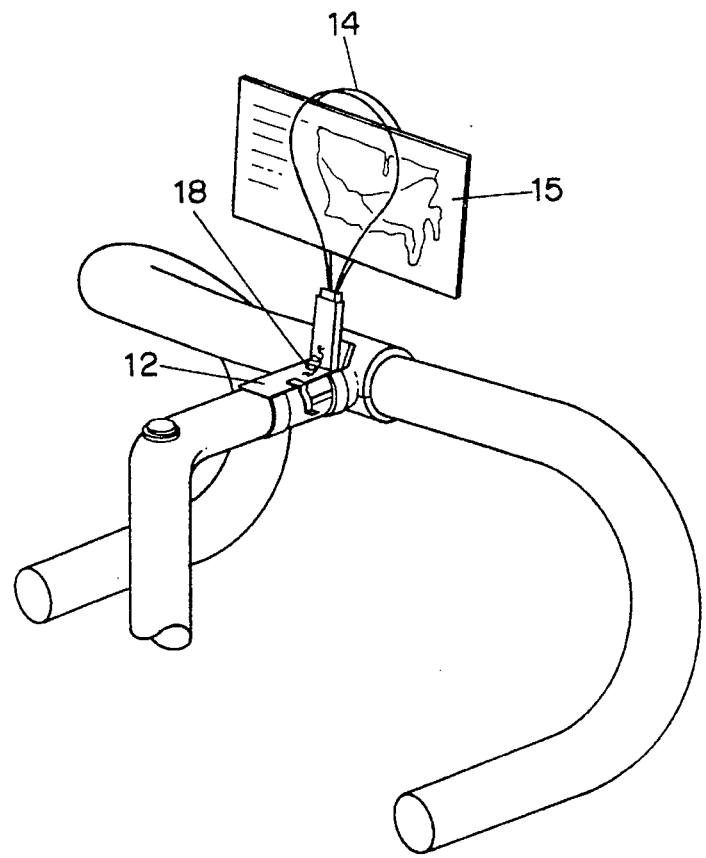

FIG. 1 illustrates a bicycle map holder utilizing an embodiment of the present invention. The reference numerals mentioned herein can be found in FIGS. 1(a) and 1(b).

The handlebar 10 is connected to the bicycle frame via stem 11. The stem support base 12 is attached to the stem 11. The map holder body 13 is hingeably connected to the support base 12.

The split ring 14 is made out of two flexible wires and is connected to the map holder body 13. The split ring 14 holds a map or cue sheet 15. Obviously, the split ring 14 can be substituted or supplemented by a single wire, clips, or other suitable retaining means in order to hold the map 15.

A spring 18 also connects the map holder body 13 and the support base 12. The spring 18 is biased so it urges the map holder body 13 (and thus the split ring 14 and map 15) to an upright position as shown in FIG. 1(b).

However, the map holder body 13 is held in a latched position as shown in FIG. 1(a) by a latch 16 so the rider's field of visibility is not blocked. The latch 16 is connected to the support base 12.

When the rider wishes to see the map 15, the rider releases the latch 16 by pulling the release tab 17. The spring 18 puts force upon and thus urges the map holder body 13 to an upright position. Additionally, a stop tab 19 keeps the map holder body 13 from going beyond the upright position.

Figure 2A:
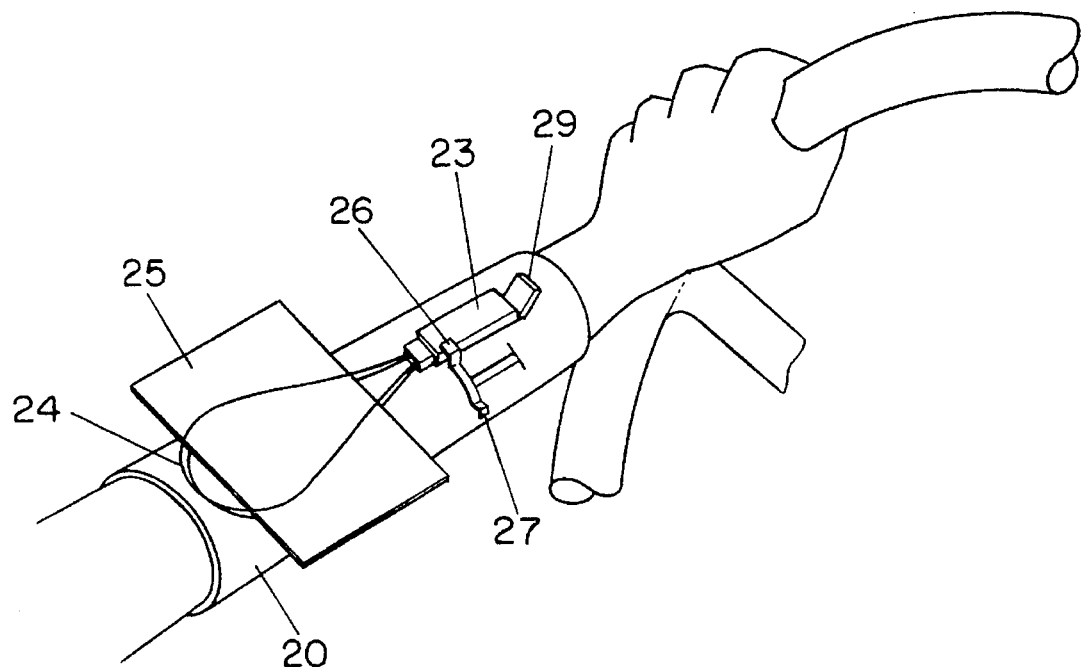
FIG. 2(a) illustrates the embodiment in a latched position and FIG. 2(b) illustrates the embodiment in an upright position.
Figure 2B:
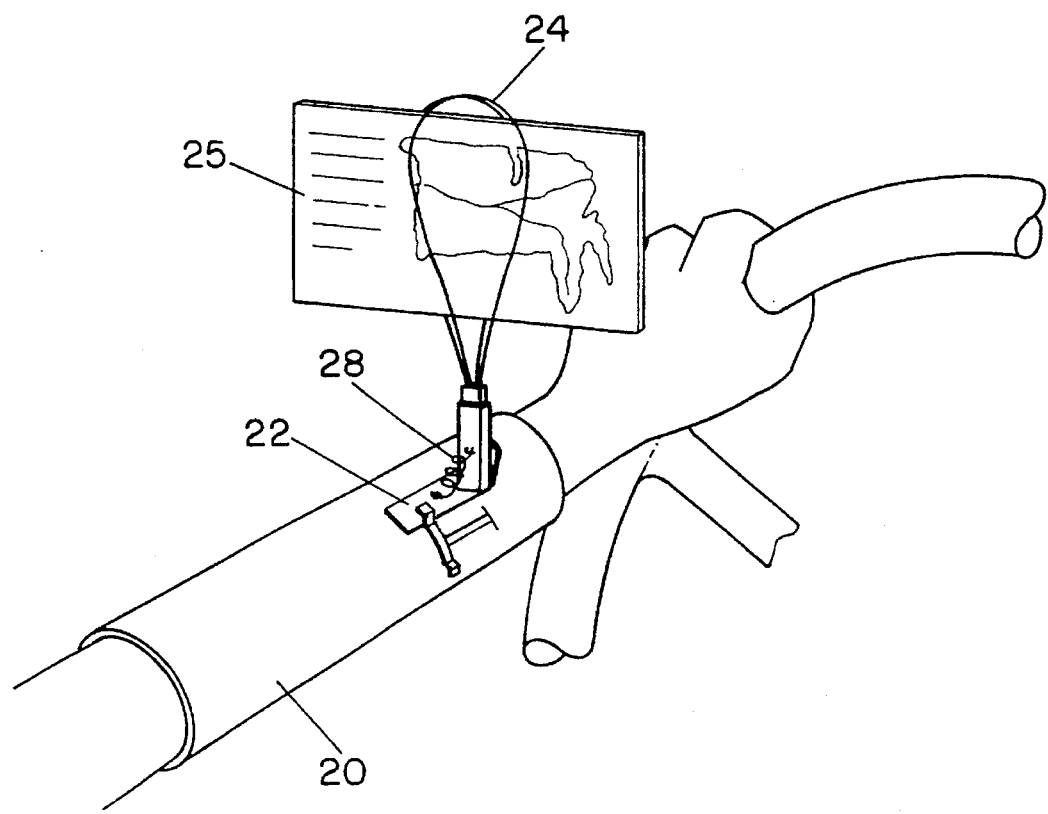

FIG. 2 illustrates a map holder that can be worn by a vehicle driver. The reference numerals mentioned herein can be found in FIGS. 2(a) and 2(b).

The sleeve 20 supports the map holder. The sleeve 20 may be constructed out of Velcro, fabrics, leather, etc. Nevertheless, the sleeve 20 is preferably made from a fabric that is breathable and that wicks away perspiration from the arm.

Sleeve support base 22 is placed on the sleeve 20. The map holder body 23 is hingeably connected to the support base 22.

The split ring 24 is made out of two flexible wires and is connected to the map holder body 23. The split ring 24 holds a map or cue sheet 25. Obviously, the split ring 24 can be substituted or supplemented by a single wire, clips, or other suitable retaining means in order to hold the map 25.

A spring 28 also connects the map holder body 23 and the support base 22. The spring 28 is biased so it urges the map holder body 23 (and thus the split ring 24 and map 25) to an upright position as shown in FIG. 2(b).

However, the map holder body 23 is held in a latched position as shown in FIG. 2(a) by a latch 26 so the driver's field of visibility is not blocked. The latch 26 is connected to the support base 22.

When the driver wishes to see the map 25, the driver releases the latch 26 by pulling the release tab 27. The spring 28 puts force upon and thus urge the map holder body 23 to an upright position. Additionally, a stop tab 29 keeps the map holder body 23 from going beyond the upright position.

Figure 3A:
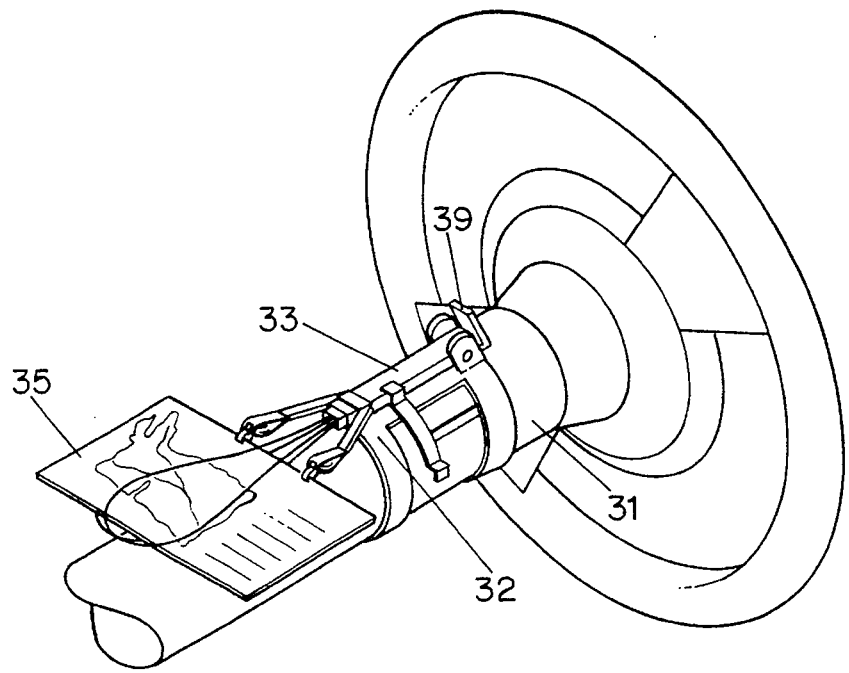
FIG. 3(a) illustrates the embodiment in a latched position.
Figure 3B:
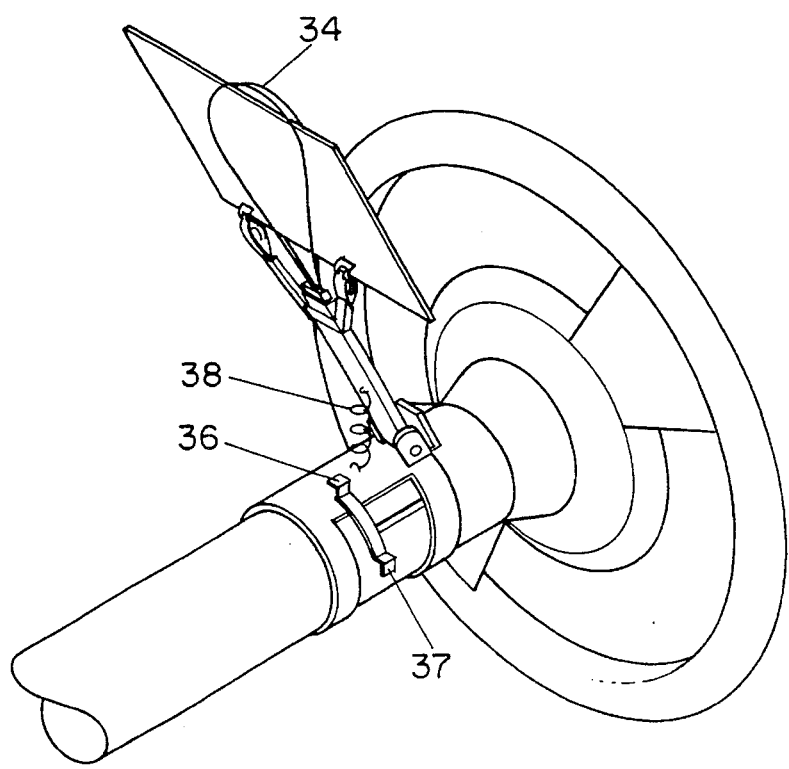
FIG. 3(b) illustrates the embodiment in an upright position, and FIG. 3(c) provides a detailed view of the embodiment.
Figure 3C:
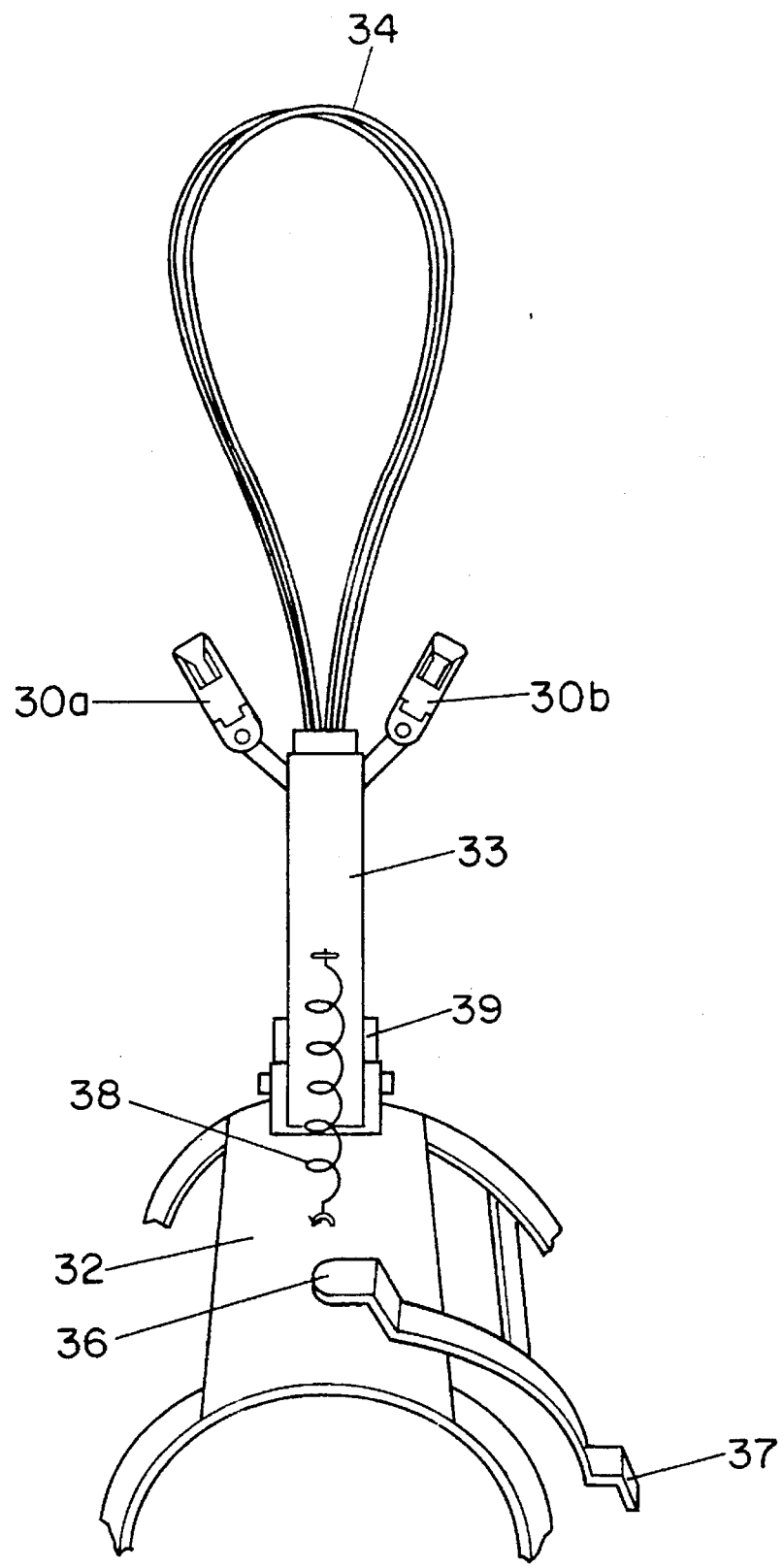

FIG. 3 illustrates a map holder utilizing an embodiment of the present invention. The reference numerals mentioned herein can be found in FIGS. 3(a), 3(b), and 3(c).

The column support base 32 is attached to the steering wheel column 31. The map holder body 33 is hingeably connected to the support base 32.

Both the split ring 34, made out of two flexible wires, and clips 30a and 30b are connected to the map holder body 33. The split ring 34 and clips 30a and 30b hold a map or cue sheet 35. Obviously, the split ring 34 can be substituted or supplemented by a single wire, or other suitable retaining means in order to hold the map 35.

A spring 38 also connects the map holder body 33 and the support base 32. The spring 38 is biased so it urges the map holder body 33 (and thus map 35) to an upright position as shown in FIG. 3(b).

However, the map holder body 33 is held in a latched position as shown in FIG. 3(a) by a latch 36 so the rider's field of visibility is not blocked. The latch 36 is connected to the support base 32.

When the rider wishes to see the map 35, the rider releases the latch 36 by pulling the release tab 37. The spring 38 puts force upon and thus urges the map holder body 33 to an upright position. Additionally, a stop tab 39 keeps the map holder body 33 from going beyond the upright position.

Figure 4A:
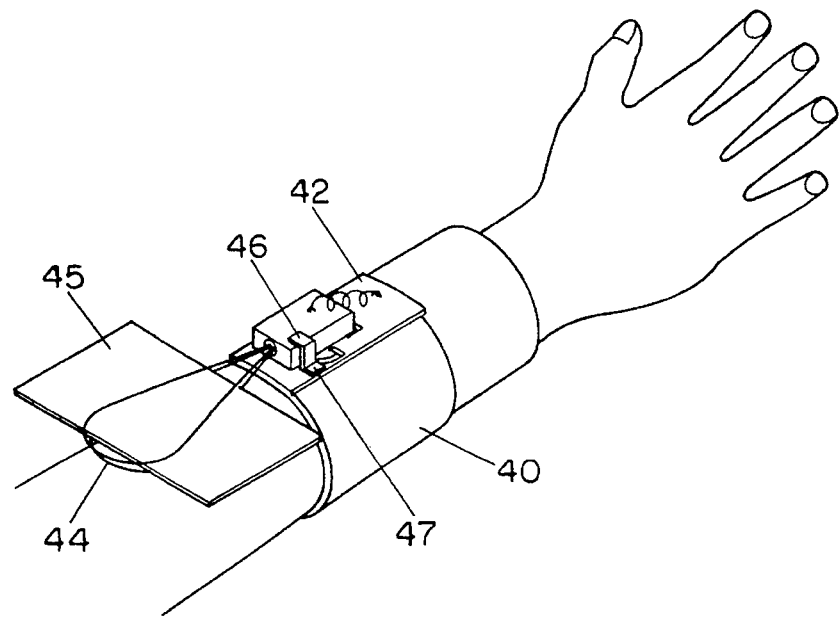
FIG. 4(a) illustrates the embodiment in a latched position and FIG. 4(b) illustrates the embodiment in an upright position.
Figure 4B:
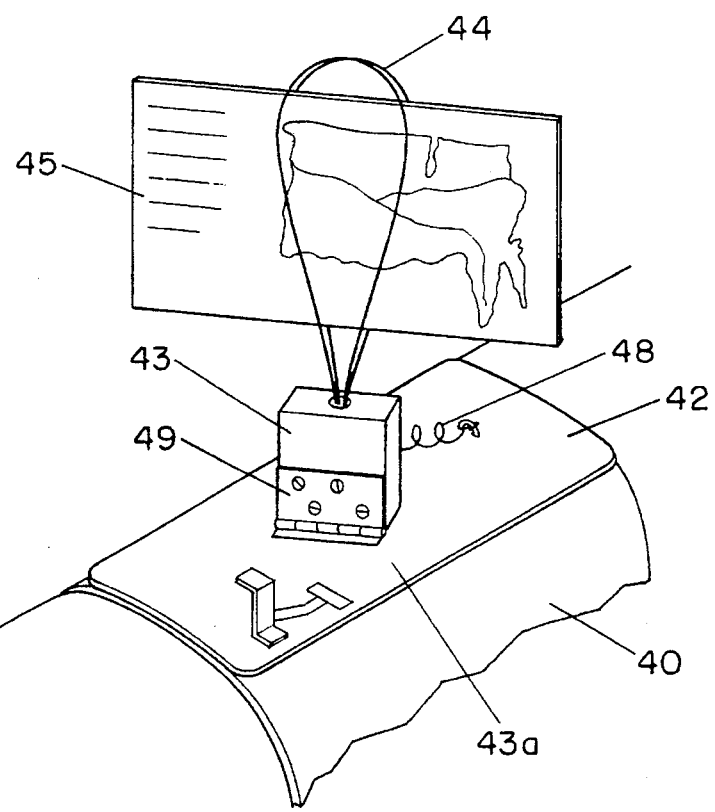

FIG. 4 illustrates a bicycle map holder utilizing an embodiment of the present invention. The reference numerals mentioned herein can be found in FIGS. 4(a) and 4(b).

The sleeve 40 supports the map holder. The sleeve 40 may be constructed out of Velcro, fabrics, leather, etc. Nevertheless, the sleeve 40 is preferably made from a fabric that is breathable and that wicks away perspiration from the arm, such as terry cloth sleeve, COOLMAX fabric, etc.

Sleeve support base 42 is placed on the sleeve 40. The map holder block 43 is hingeably connected to the support base 42 via hinge 49.

The split ring 44 is made out of two flexible wires and is connected to the map holder block 43. The split ring 44 holds a map or cue sheet 45. Obviously, the split ring 44 can be substituted or supplemented by a single wire, clips, or other suitable retaining means in order to hold the map 45.

A spring 48 also connects the map holder block 43 and the support base 42. The spring 48 is biased so it urges the map holder block 43 (and thus the split ring 44 and map 45) to an upright position as shown in FIG. 42(b).

However, the map holder body 43 is held in a latched position as shown in FIG. 4(a) by a latch 46 so the person's field of visibility is not blocked. The latch 46 is connected to the support base 42.

When the person wishes to see the map 45, he releases the latch 46 by pulling the release tab 47. The spring 48 puts force upon and thus urge the map holder body 43 to an upright position.

A-separate stop tab to keep the map holder block 43 from going beyond the upright position as described in the previous embodiments is not required since the map holder block 43 would stop moving when its edge 43a contacts the base of the hinge 49. It is obvious that, by providing a different angle on edge 43a, the map holder block 43 can be inclined to a predetermined angle instead of being perpendicular as shown in FIG. 4(b).

It will be understood that the invention is not limited to the embodiments described and illustrated herein as they have been given only as examples of the invention. Without going beyond the scope of the invention, certain arrangements may be changed or certain means may be replaced by equivalent means.

For example, the embodiments described above can be built on the dashboard, or the windshield of a vehicle. Similarly, the spring mechanism described above may be replaced by any other spring, such as a spring-loaded hinge, elastometer or rubber band mechanisms, etc. In addition, the spring mechanism, such as a clock-type spring may also rotate the map holder body so the rider or driver has a better view of the map. Furthermore, the release mechanism can also be replaced by other mechanisms known in the art. Nevertheless, these variations are viewed as equivalent of the present invention.

I claim:

1. A map holder comprising:

holding means for holding a map in at least a first latched position and a second upright position, said holding means comprising a map holder body;

positioning means interconnected to said holding means for maintaining said holding means in said first latched position and for applying a force to and urging said holding means to said second upright position, said positioning means comprising a spring which applies force to said holding means, thereby moving said holding means to said second upright position, wherein said spring is capable of rotating the holding means to enable a user thereof to view the map in the second upright position.

2. The map holder of claim 1, wherein said positioning means further comprises:

latch means for maintaining said holding means in said first position.

3. The map holder of claim 1, further comprising a support sleeve means for supporting said positioning means.

4. The map holder of claim 1, further comprising a support means for supporting said positioning means.

5. The map holder of claim 1, wherein said holding means comprise a split ring capable of receiving the map.

6. The map holder of claim 1, wherein said positioning means comprise a latch to maintain the map holder in the first latched position.

7. The map holder of claim 1, further comprising a sleeve capable of being worn by the user, said sleeve being integral to and supporting said holding means.

8. The map holder of claim 7, wherein the sleeve is integral to a sleeve support base which is hingeably connected to the map holder body.

9. A method of using a map holder comprising holding means for holding a map and positioning means for maintaining said holding means in a first latched position and for moving said holding means to a second upright position, said method comprising the steps of:

placing said holding means comprising a map holder body in said first latched position;

maintaining said holding means in said first latched position, wherein said maintaining step is performed by said positioning means interconnected to said holding means;

releasing said holding means; and urging said holding means to said second upright position, wherein said urging step is performed by said positioning means, said positioning means comprising a spring which applies force to said holding means, thereby moving said holding means to said second upright position, wherein said spring is capable of rotating the holding means to enable a user thereof to view the map in the second upright position.

10. The map holder of claim 5, wherein said split ring comprises two flexible wires.

11. The method of claim 9, wherein said holding means comprise a split ring capable of receiving the map.

12. The method of claim 11, wherein said split ring comprises two flexible wires.

13. The method of claim 9, wherein said positioning means comprise a latch to maintain the map holder in the first latched position.

14. The method of claim 9, further comprising a sleeve capable of being worn by the user, said sleeve being integral to and supporting said holding means.

15. The method of claim 14, wherein the sleeve is integral to a sleeve support base which is hingeably connected to the map holder body.

* * * * *